(12) United States Patent
Yu et al.

(10) Patent No.: US 9,219,701 B2
(45) Date of Patent: Dec. 22, 2015

(54) DISTRIBUTED METHOD AND SYSTEM FOR IMPLEMENTING LINK AGGREGATION CONTROL PROTOCOL (LACP) STANDARD STATE MACHINES

(75) Inventors: Liyuan Yu, Shenzhen (CN); Hongyuan Shi, Shenzhen (CN); Xiaoxiang Wu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 181 days.

(21) Appl. No.: 13/885,487

(22) PCT Filed: Dec. 23, 2010

(86) PCT No.: PCT/CN2010/080166
§ 371 (c)(1),
(2), (4) Date: May 15, 2013

(87) PCT Pub. No.: WO2012/065337
PCT Pub. Date: May 24, 2012

(65) Prior Publication Data
US 2013/0238738 A1    Sep. 12, 2013

(30) Foreign Application Priority Data
Nov. 15, 2010 (CN) .......................... 2010 1 0546365

(51) Int. Cl.
*G06F 15/16* (2006.01)
*H04L 12/58* (2006.01)
*H04L 12/709* (2013.01)

(52) U.S. Cl.
CPC .............. *H04L 51/00* (2013.01); *H04L 45/245* (2013.01); *Y02B 60/33* (2013.01)

(58) Field of Classification Search
USPC .......................................................... 709/227
See application file for complete search history.

(56) References Cited

U.S. PATENT DOCUMENTS 6,298,061 B1    10/2001   Chin et al.

FOREIGN PATENT DOCUMENTS

CN              101094157         12/2007

OTHER PUBLICATIONS

International Search Report for PCT/CN2010/080166, English Translation attached to original, Both completed by the Chinese Patent Office on Aug. 4, 2011, 6 Pages.

(Continued)

*Primary Examiner* — Alicia Baturay
(74) *Attorney, Agent, or Firm* — Brooks Kushman P.C.

(57) ABSTRACT

The present invention provides a distributed method for implementing Link Aggregation Control Protocol (LACP) standard state machines, wherein the method includes: after receiving a message, a physical port transmits it to a receive machine; the receive machine, a periodic transmission machine, a multiplexer (MUX) machine, and a transmit machine are triggered to operate in turn; the selection logic on a master controller is triggered to operate, and the processing of the message is completed according to the physical link selection state of the selection logic on the master controller; wherein, the receive machine, periodic transmission machine, MUX machine, and transmit machine operate on the link card at which the physical port is located, and the selection logic operates on the master controller.

8 Claims, 2 Drawing Sheets

(56) References Cited

OTHER PUBLICATIONS

LAN MAN Standards Committee of the IEEE-SA Standards Board. Mar. 30, 2000, IEEE Std 802.3ad-2000, (Split Into Two Documents) 183 Pages, Part One 100 Pages, "Amendment to Carrier Sense Multiple Access with Collision Detection (CSMA/CD) Access Method and Physical Layer Specifications."

LAN MAN Standards Committee of the IEEE-SA Standards Board. Mar. 30, 2000, IEEE Std 802.3ad-2000, (Split Into Two Documents) 183 Pages, Part Two 83 Pages, "Amendment to Carrier Sense Multiple Access with Collision Detection (CSMA/CD) Access Method and Physical Layer Specifications."

Tao et al. Computer Systems and Applications May 2010, vol. 19, No. 5, p. 104-108, "Design of Link Aggregation Finite State Machine Module Based on LACP."

DISTRIBUTED METHOD AND SYSTEM FOR IMPLEMENTING LINK AGGREGATION CONTROL PROTOCOL (LACP) STANDARD STATE MACHINES

CROSS-REFERENCE TO RELATED APPLICATION

This application is the U.S. national phase of PCT Appln. No. PCT/CN2010/080166 filed on Dec. 23, 2010, which claims priority to Chinese Patent Application No. 201010546365.6 filed on Nov. 15, 2010, the disclosures of which are incorporated in their entirety by reference herein.

TECHNICAL FIELD

The present document relates to a data communication field, and in particular, relates to a distributed method and system for implementing Link Aggregation Control Protocol (LACP) standard state machines.

BACKGROUND OF THE RELATED ART

The link aggregation is an aggregation of a series of physical ports, which presents a single, standard IEEE802.3 interface to the Media Access Control (MAC) Client, and plays a role in increasing the bandwidth of the physical port and the redundant standby. The link aggregation protocol is a standard protocol which controls the link aggregation, operates among the peer to peer link aggregators, determines the joining and removing of the physical port through an interaction of the protocol message, and determines whether the physical port can receive and send the data message. The standard link aggregation protocol is a centralized state machine including five protocol state machines with particular functions which operate on the physical port and connect each other.

The current LACP state machine includes the following state machines, their functions and interrelations are described as follows:

a receive (RX) state machine (Receive machine): the state machine receives the link aggregation control protocol data unit coming from the Partner (opposite end), records the information therein and uses a short timeout or a long timeout to make it overtime according to a timeout set by the LACP; the RX state machine evaluates the information from the Partner, determines whether the Actor (the local end) and the opposite end have already agreed that the exchanged protocol information is used for the port aggregating with other ports or becoming an independent port to a certain extent; if not agreed, then the RX state machine sets the Need-To-Transmit (NTT) identifier to send new protocol information to the Partner; if the protocol information of the Partner is overtime, the RX state machine installs a default parameter value for other state machines use.

A periodic state machine (Periodic Transmission machine): it determines the aggregation mode of the Actor and the Partner, and, in order to maintain the aggregation, determines whether to exchange the LACPDU periodically (if any one end or both ends are configured to be Active, then a regular LACPDU interaction happens).

A selection state machine (Selection Logic): it is responsible for selecting an Aggregator correlated with the port, and decides which Aggregator is in an active state in a plurality of Aggregators.

A MUX state machine (MUX machine): it is responsible for turning on or shutting down the collecting and distributing of the port according to the request of the present protocol information.

A sending (TX) state machine (Transmit machine): it sends the LACPDU required by other state machines or periodically.

The LACP standard state machine is a centralized state machine. FIG. 1 has described a diagram of the operation relation of the current LACP centralized state machine, wherein, the current LACP centralized state machine operates successively according to the sequence of the receive machine, the periodic transmission machine, the selection logic, the MUX machine and the transmit machine.

A distributed system is divided as the Management Processor (MP), the Routing Processor (RP), and the Network Processor (NP) according to the functions, wherein the MP mainly completes the functions such as command explanation, network management, etc., the RP mainly realizes the protocols, and the NP mainly completes receiving, sending and forwarding the message, etc. For a centralized system, the MP, the RP, and the NP are implemented on one CPU, mainly used in the low-end device. For a distributed system, the MP, the RP and the NP are placed on their independent CPUs, mainly used in the high-end device. In order to improve the performance of forwarding the message and increase the stability and reliability of forwarding the message, the NP is placed and implemented on a plurality of CPUs. In order to increase the reliability of the RP, an active-standby system is adopted, and there are two sets of RPs which operate on different CPUs in the active-standby system, wherein, they can be standby for each other.

The ways for implementing the active-standby system are divided into two kinds: the active-standby cold standby and the active-standby hot standby. It is explained hereinafter by taking the active-standby system of the RP as an example. The active-standby cold standby refers to: when the active RP is abnormal, the standby RP switches from a standby state to an active state, at this time, the switched RP re-reads the database, performs an initialization, finishes an interaction with the NP, and then switches to an operating state; in this process, the dynamic data on the RP before switching are all lost, and it needs to study again, which causes instability of the network and results in an interruption of the forwarding. The active-standby hot standby refers to: after the standby board is inserted and finishes the message exchange with the active board, and then it enters the batch synchronization state, and synchronizes the static data and the dynamic data at the active RP to the standby board; after the batch synchronization finishes, the real-time synchronization is performed between the active board and the standby board, and the RP on the active board synchronizes the changed data to the standby board in time; in this way, after an active-standby switching, most of the data of the active board are stored on the standby board, and the dynamic data are recovered timely after the active-standby switching through the data smoothing and the Graceful Restart (GR) of the protocol, which reduces the instability of the network, and also guarantees that the current forwarding is not interrupted during the active-standby switching.

The current LACP centralized state machine operates on the RP, the active-standby cold standby is implemented very easily, but it is much difficult to implement the active-standby hot standby. The active-standby hot standby will have a large number of protocols to operate the GR function in the active-standby switching process, which leads to the problems, such as, an increase of the utilization rate of the CPU where the RP locates, an message delivery delay, an increase of the probability of the delivery lost, an unpunctual timer operation, etc., and the completion time of the active-standby switching is linearly increased with the increase of the service data bulk.

In order to maintain the aggregation, the local end Actor and the opposite end Partner of the LACP must exchange the LACPDU periodically, the problems, such as, a message delivery delay and a delivery lost, an unpunctual timer operation, etc., occurred in the active-standby switching process will cause that the Partner cannot receive the LACPDU sent by the Actor within the timeout period, and then will result in a link disconnection of the physical link and an interruption of the flow forwarding. Especially, when the Partner sets a short timeout (it requires the Actor to send one LACPDU per second, and if the Partner does not receive the LACPDU within 3 seconds, then the link is broken due to the timeout), the phenomenon such as the link disconnection and the link cutout will occur much easily.

In addition, in the LACPDU message exchange process of the Actor and the Partner, the Actor, after receiving the message from the physical port of the line card (NP), delivers the message to the management processor (RP)-active, and hands it to the receive machine for processing, and the receive machine, the periodic transmission machine, the selection logic, the MUX state machine, and the transmit machine are called sequentially; when the message is sent, it needs to be delivered by the management processor (RP)-active to the corresponding line card (NP) for sending. The two message processes between the management processor (RP)-active and the line card increases the delay of the LACPDU message exchange, reduces the performance of the redundancy switchover of the physical link, and consumes the valuable CPU resources at the same time.

In sum, that the distributed communication device operates the LACP centralized state machine will have some problems, such as inefficiency, unreliablity, difficulty of implementing the active-standby hot standby, etc.

SUMMARY OF THE INVENTION

The present document provides a distributed method and system for implementing Link Aggregation Control Protocol (LACP) standard state machines, which increases the operating efficiency, the reliability and the stability of implementing a active-standby hot standby of the distributed communication device.

In order to solve the above-mentioned technical problem, the present document provides a distributed method for implementing the LACP standard state machines, comprising:

after receiving a message at a physical port, transmitting to a receive machine;

triggering the receive machine, a periodic transmission machine, a multiplexer (MUX) machine, and a transmit machine to operate in turn;

triggering a selection logic on a master control to operate, and completing processing of the message according to a physical link selection state of the selection logic on the master control; wherein, the receive machine, the periodic transmission machine, the MUX machine, and the transmit machine operate on a line card at which the physical port is located, and the selection logic operates on the master control.

The above-mentioned method further comprises: if there is a change in state machine data of a state machine on the line card before and after the state machine operates, then synchronizing the changed state machine data of the state machine on the line card to the master control.

The trigger sources of the state machine operation on the line card include one or any combination of the follows: the message received by the receive machine, a timeout of a periodic duty timer of the state machine on the line card, and the changed state machine data synchronized from the master control.

The trigger sources of the selection logic operation on the master control include one or any combination of the follows: a timeout of a periodic duty timer of the selection logic, the changed state machine data synchronized from the line card, a change in the state machine data of the selection logic before and after the selection logic operates, and a change of configured data.

The method further can comprise: when triggering the selection logic on the master control to operate, synchronizing the data on the master control to a master control-standby and all line cards.

The above-mentioned method further can comprise: during an active-standby switching, the master control-standby completes the switching according to the received data.

In order to solve the above-mentioned technical problem, the present document further provides a distributed system for implementing Link Aggregation Control Protocol (LACP) standard state machines, comprising: a line card and a master control, wherein, the line card is configured as a line card at which a physical port is located, and a receive machine, a periodic transmission machine, a multiplexer (MUX) machine, and a transmit machine are operated on the line card;

the master control is configured to operate a selection logic on the master control;

thus, the message received from the physical port can be sent to the receive machine, and the receive machine, the periodic transmission machine, the MUX machine and the transmit machine can be triggered to operate in turn, so as to complete processing of the message in combination with a physical link selection state of the selection logic on the master control.

The above-mentioned line card can be further configured to: if there is a change in state machine data of a state machine on the line card before and after the state machine operates, then synchronize the changed state machine data of the state machine on the line card to the master control.

The trigger sources of the state machine operation on the line card include one or any combination of the follows: the message received by the receive machine, a timeout of a periodic duty timer of the state machine on the line card, and the changed state machine data synchronized from the master control.

The trigger sources of the selection logic operation on the master control include one or any combination of the follows: a timeout of a periodic duty timer of the selection logic, the changed state machine data synchronized from the line card, a change in the state machine data of the selection logic before and after the selection logic operates, and a change of configured data.

The method and system of the present document have solved the problems, such as inefficiency, unreliable and difficult to implement the active-standby hot standby, of the LACP centralized state machines operated by the distributed communication device, thus improved the operating efficiency of the LACP state machines and enhancing the operation reliability and stability of the LACP state machines.

BRIEF DESCRIPTION OF DRAWINGS

The accompanying drawings described herein are used to provide further understanding for the present document and constitute a part of the present application. The illustrated embodiments of the present document and the description thereof are used to explain the present document, rather than constituting an inappropriate limitation to the present document. Wherein.

PREFERRED EMBODIMENTS OF THE INVENTION

Figure 1:
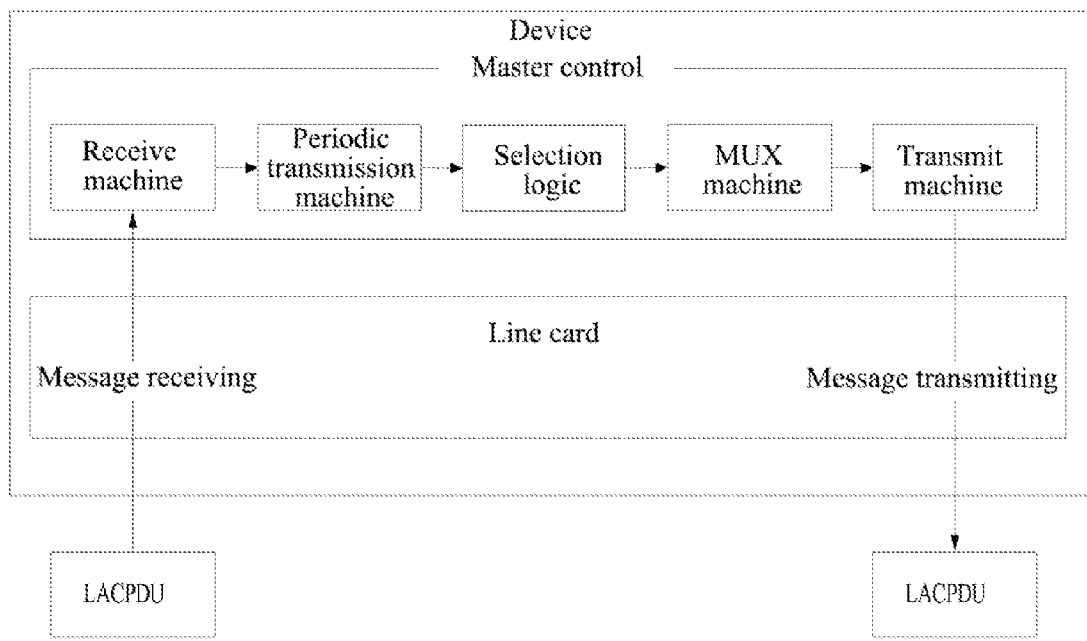
FIG. 1 describes a diagram of an operation relation of a current LACP centralized state machine of the related art.

The present document is described in detail with reference to the accompanying drawings and in combination with embodiments hereinafter. It should be illustrated that, in the case of not conflicting, the embodiments in the present application and features in these embodiments can be combined with each other.

The technical scheme of the present embodiment is as follows:

four state machines operating based on a physical port, that is, a receive machine, a periodic transmission machine, a multiplexer (MUX) machine, and a transmit machine operate on a line card at which the physical port is located, and a selection logic operates on a master control;

after receiving a message from the physical port, it is transmitted to the receive machine, and the receive machine, the periodic transmission machine, the MUX machine and the transmit machine are called in turn; and the processing of the message is completed in combination with the selection logic on the master control.

The technical scheme of the present embodiment is as follows: if there is a change in state machine data on the line card before and after the state machine operates, then the state machine data on the line card are synchronized to the master control.

The technical scheme of the present embodiment is as follows:

trigger sources of the state machine operation on the line card include one or any combination of the follows: the message received by the receive machine, a timeout of a periodic duty timer of the state machine on the line card, and the changed state machine data synchronized from the master control.

The technical scheme of the present embodiment is as follows: trigger sources of the selection logic operation on the master control include one or any combination of the follows: a timeout of a periodic duty timer of the selection logic, the changed state machine data synchronized from the line card, a change in the state machine data of the selection logic before and after the selection logic operates, and a change of configured data.

The technical scheme of the present embodiment is as follows: when triggering the selection logic on the master control to operate, the data on the master control are synchronized to a master control-standby and all line cards.

The technical scheme of the present embodiment is as follows: during an active-standby switching, the master control-standby completes switching according to the received synchronization data.

The system technology scheme of the present embodiment is as follows: the system includes: a line card and a master control, wherein, four state machines, that is, a receive machine, a periodic transmission machine, a multiplexer (MUX) machine, and a transmit machine, operate on the line card; and a selection logic operates on a master control;

the message received from the physical port is transmitted to the receive machine, and the receive machine, the periodic transmission machine, the MUX machine and the transmit machine are called in turn, so as to complete the processing of the message in combination with the selection logic on the master control.

The technical scheme of the present embodiment is as follows: if there is a change in state machine data on the line card before and after the state machine operates, then the state machine data on the line card are synchronized to the master control.

The technical scheme of the present embodiment is as follows: trigger sources of the state machine operation on the line card include one or any combination of the follows: the message received by the receive machine, a timeout of a periodic duty timer of the state machine on the line card, and the changed state machine data synchronized from the master control.

The technical scheme of the present embodiment is as follows: trigger sources of the selection logic operation on the master control include one or any combination of the follows: a timeout of a periodic duty timer of the selection logic, the changed state machine data synchronized from the line card, a change in the state machine data of the selection logic before and after the selection logic operates, and a change of configured data.

Figure 2:
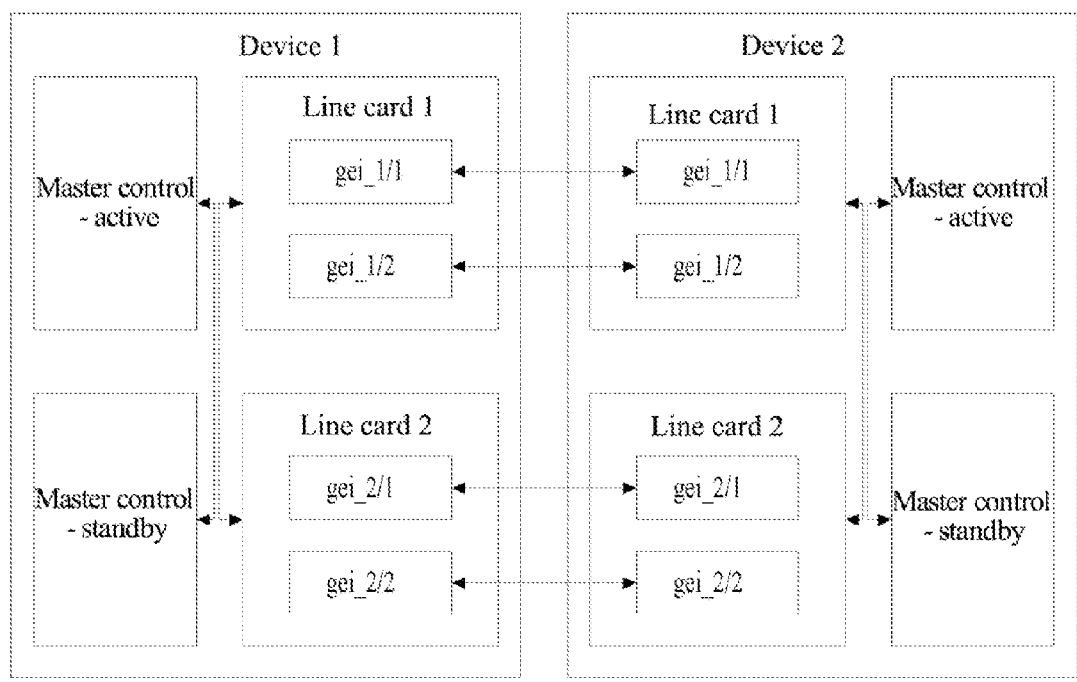
FIG. 2 is a diagram of networking of distributed devices according to an application of the present document.

FIG. 2 is a diagram of networking of distributed devices according to an application of the present document. The device includes a master control-active, a master control-standby, a line card 1 and a line card 2; gei_1/1 and gei_1/2 are on the line card 1, gei_2/1 and gei_2/2 are on the line card 2, and gei represents an interface of giga. The receive machine, the periodic transmission machine, the MUX machine, and the transmit machine operate on the line card sequentially in order; the four state machines operate taking each physical link as a unit, and they only need to operate on the line card at which the physical link is located. The selection logic operates on the master control-active, which is responsible for selecting the physical link into an aggregator which has the same characteristic as the physical link, and determines which aggregator in a plurality of aggregators is in an active state, while other aggregators are in an inactive state.

Figure 3:
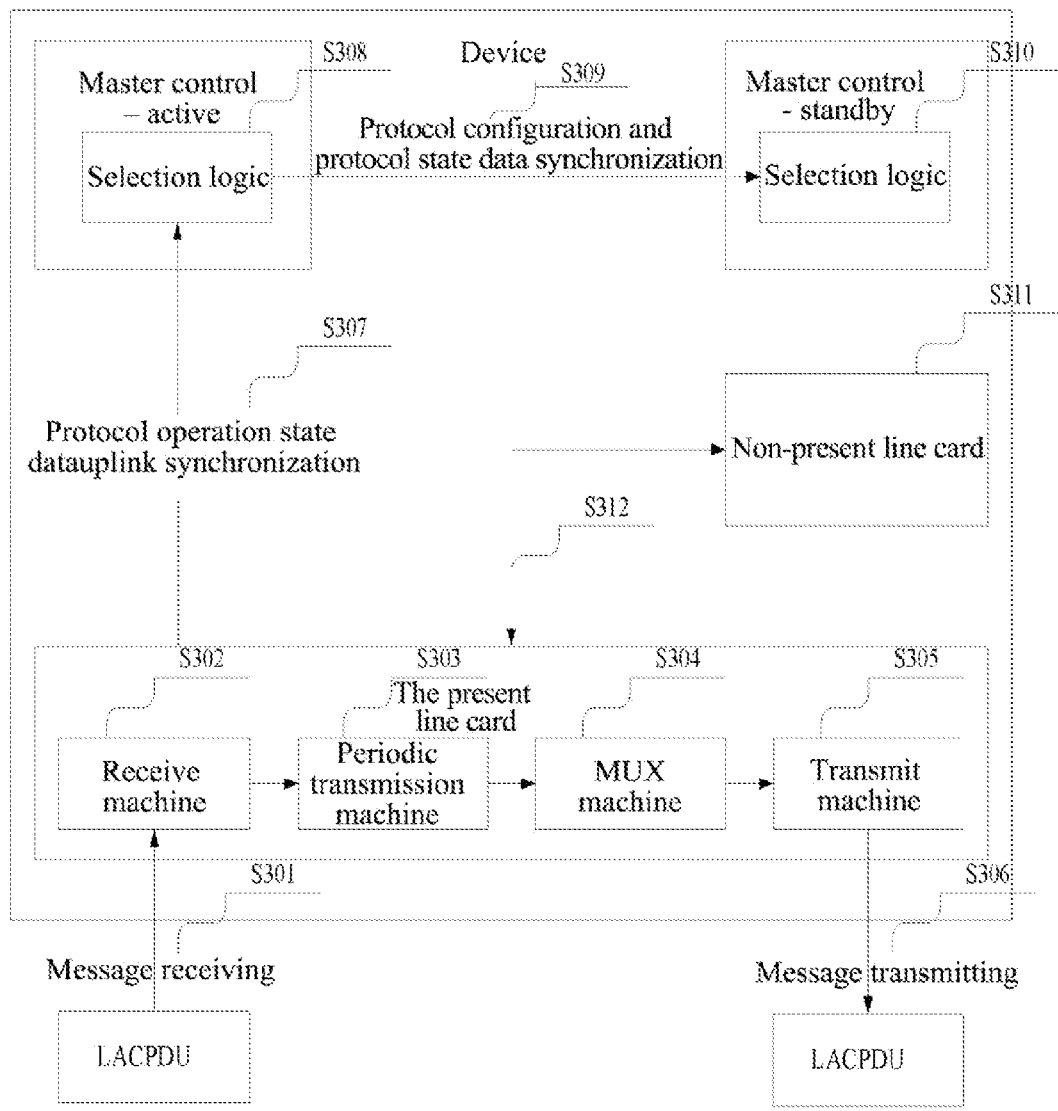
FIG. 3 is a diagram of an operation relation of an LACP distributed state machine of the present document.

FIG. 3 is a diagram of an operation relation of an LACP distributed state machine of the present document. After the message is received at the physical port on the line card, the message is no longer delivered to the master control-active, but is sent to the receive machine directly for processing, and the receive machine, the periodic transmission machine, the MUX machine, and the transmit machine are called sequentially. Only when the state machine operation data of the physical link on the line card changes, the state machine data are synchronized to the master control-active; in this way, the number of the message deliveries between the line card and the master control is reduced greatly. Base on the premise that the physical link has already been set up through protocols successfully, an abnormal master control will not interrupt the normal protocol interaction of the physical link on the line card; when the line card at which the port is not located is abnormal, it will not influence the normal protocol interaction of the physical link on other line cards as well, which improves reliability and stability of the LACP protocol state machine greatly in this way. The line card at which the physical port is located is called the present line card in the following methods, and other line cards are called non-present line cards.

In step S301, the LACPDU message sent by the opposite end is received at the physical port;

in step S302, after the LACPDU message is received at the physical port of the present line card, the message is sent to the receive machine of the LACP module for processing directly, while the message is no longer delivered to the master control; the receive machine records the information in the LACPDU message and uses the short timeout or the long timeout to make the Partner overtime according to the timeout set by the Partner; the RX state machine evaluates the information from the Partner, determines whether the Actor and the Partner have already agreed that the exchanged protocol information is used for the port aggregating with other ports or becoming an independent port to a certain extent; if not agreed, then the receive machine generates the Need-To-Transmit (NTT) to send new protocol information to the Partner; if the protocol information of the Partner is overtime, the receive machine installs the default parameter value for other state machines to use;

in step S303, the periodic transmission machine operates after the receive machine operates, the aggregation mode of the Actor and the Partner is determined, and, in order to maintain the aggregation, it is to determine whether to switch the LACPDU periodically;

in step S304, the MUX machine operates after the periodic transmission machine operates, the MUX machine is responsible for turning on or shutting down the collecting and distributing of the port as required by the current protocol information;

in step S305, the transmit machine operates after the MUX machine operates, the transmit machine is responsible for processing the sending as required by other state machines or based on the regular LACPDU;

in step S306, the transmit machine sends the LACPDU to the physical port of the Partner;

in step S307, when there is a change in state machine data of the state machine on the present line card before and after the state machine operates, then the changed state machine data on the present line card are synchronized to the master control;

in step S308, on the master control, after operating, the selection logic selects the physical link into an aggregator which has the same characteristic as the physical link, and determines which aggregator in a plurality of aggregators is in an active state, while other aggregators are in an inactive state;

in step S309, if there is a change in the state machine data of the selection logic before and after the selection logic operates, there is a change in the state machine data synchronized from the present line card, and/or, there is a change in the configuration data, then the data on the master control are synchronized to the master control-standby, the non-present line card and the present line card;

in step S310, the master control-standby, after receiving the data from the synchronization, stores the data used for the data smoothing after the active-standby switching;

in step S311, the non-present line card, after receiving the data from the synchronization, does not process them; and in step S312, the present line card, after receiving the data from the synchronization, updates the configuration data and the selection logic data, and verifies the data of the four state machines of the present line card.

The specific application in the active-standby switching process of the present document is illustrated hereinafter by taking the networking mode of the distributed devices in FIG. 2 as an example:

before the active-standby switching, the operation data of the physical link on the line card are synchronized to the master control-active, the master control-active synchronizes the operation data and the configuration of the Link Aggregation Group and all physical links under the Link Aggregation Group to the master control-standby, and the master control-standby stores the operation data and the configuration of the Link Aggregation Group and all physical links under the Link Aggregation Group.

After the active-standby switching, smoothing is performed to the current operation data on the basis of the Link Aggregation Group and the physical link sequentially. Normally, the output data of the selection logic of the master control-active will not change after the switching, therefore, the line card cannot perceive the influence of the active-standby switching of the master control on the line card, that is, the active-standby switching of the master control is transparent to the line card. Especially, when testing the influence of the maximum configuration on the active-standby switching, there is no influence on the line card when there is an abnormal condition, such as, the master control-active CPU after the switching is busy, or there is a delay of the message delivery between the master control-active and the line card, or the message lose, etc., which has guaranteed the smooth transition of the LACP protocol state machine in the active-standby switching process.

In conclusion, on the basis of following the LACP standard protocol state machine, the present document implements the LACP standard protocol state machine through the distributed mode, improves the operating efficiency of the LACP state machine effectively, and enhances the operation reliability and stability of the LACP standard protocol state machine.

Of course, for the LACP standard protocol state machine, the present document may have a variety of other combinations. Those skilled in the art can make the corresponding modifications and variations according to the present document without departing from the spirit and essence of the present document. And all of these modifications or the variations should be embodied in the scope of the appending claims of the present document.

Industrial Applicability

Compared with the related art, with the present document, the problems, such as inefficiency, unreliability and difficulty of implementing the active-standby hot standby, of the LACP centralized state machines operated by the distributed communication device has been solved, the operating efficiency of the LACP state machines is improved and the reliability and stability of the operation of the LACP state machines is enhanced.

What we claim is:

1. A method for implementing Link Aggregation Control Protocol (LACP) standard state machines in a distributed system which is divided as a Management Processor (MP), a Routing Processor (RP) and a Network Processor (NP) according to functions, comprising:

after receiving a message at a physical port on a NP of a plurality of NPs, directly transmitting the message to a receive state machine without delivering to an RP - active on which a selection state machine operates;

triggering the receive state machine, a periodic state machine, a multiplexer (MUX) state machine, and a sending state machine to operate in turn, wherein all of the receive state machine, the periodic state machine, the MUX state machine, and the sending state machine operate on the NP, these four state machines operate taking each physical link as a unit and they only need to operate on the NP at which the physical link is located;

if there is a change in state machine data of at least one of the four state machines on the NP before and after the state machine operates, then synchronizing the changed state machine data of the state machine to the RP—active on which the selection state machine operates, and then triggering the selection state machine on the RP—active to operate and completing processing of the message according to a physical link selection state of the selection state machine on the RP—active;

so as to reduce the number of the message deliveries between the NP and the RP—active since the five state machines are distributed in a way that the receive state machine, the periodic state machine, the MUX state machine and the sending state machine operate on the NP and the selection state machine operates on the RP—active.

2. The method according to claim 1, wherein, trigger sources of the state machine operation on the NP include one or any combination of the follows: the message received by the receive state machine, a timeout of a periodic duty timer of the state machine on the NP, and the changed state machine data synchronized from the RP—active.

3. The method according to claim 1, wherein, trigger sources of the selection state machine operation on the RP—active include one or any combination of the follows: a timeout of a periodic duty timer of the selection state machine, the changed state machine data synchronized from the NP, a change in the state machine data of the selection state machine before and after the selection state machine operates, and a change of configured data.

4. The method according to claim 3, further comprising: when triggering the selection state machine on the RP—active to operate, synchronizing the data on the RP active to a RP—standby and all the NPs.

5. The method according to claim 4, further comprising: during an active-standby switching, the RP standby completes switching according to the received data.

6. A distributed system for implementing Link Aggregation Control Protocol (LACP) standard state machines, which is divided as a Management Processor (MP), a Routing Processor (RP) and a Network Processor (NP) according to functions, and comprising: a plurality of NPs, an RP—active and an RP—standby, wherein, one or more physical ports are located at each NP, and a receive state machine, a periodic state machine, a multiplexer (MUX) state machine, and a sending state machine are operated on the NP; and a selection state machine is operated on the RP—active;

each NP is configured to: receive a message at a physical port on this NP, directly transmit the message to the receive state machine on this NP without delivering to the RP—active on which the selection state machine operates, trigger the receive state machine, the periodic state machine, the MUX state machine and the sending state machine to operate in turn; wherein these four state machines operate taking each physical link as a unit and they only need to operate on the NP at which the physical link is located;

the RP—active is configured to, if there is a change in state machine data of at least one of the four state machines on the NP before and after the state machine operates, then synchronize the changed state machine data of the state machine to the RP—active on which the selection state machine operates, and then trigger the selection state machine on the RP—active to operate and complete processing of the message according to a physical link selection state of the selection state machine on the RP—active;

so as to reduce the number of the message deliveries between the NP and the RP—active since the five state machines are distributed in a way that the four state machines, the receive state machine, the periodic state machine, the MUX state machine and the sending state machine, operate on the NP and the selection state machine operates on the RP—active.

7. The system according to claim 6, wherein, trigger sources of the state machine operation on the NP include one or any combination of the follows: the message received by the receive state machine, a timeout of a periodic duty timer of the state machine on the NP, and the changed state machine data synchronized from the RP—active.

8. The system according to claim 6, wherein, trigger sources of the selection state machine operation on the RP—active include one or any combination of the follows: a timeout of a periodic duty timer of the selection state machine, the changed state machine data synchronized from the NP, a change in the state machine data of the selection state machine before and after the selection state machine operates, and a change of configured data.

* * * * *